Figure 1:
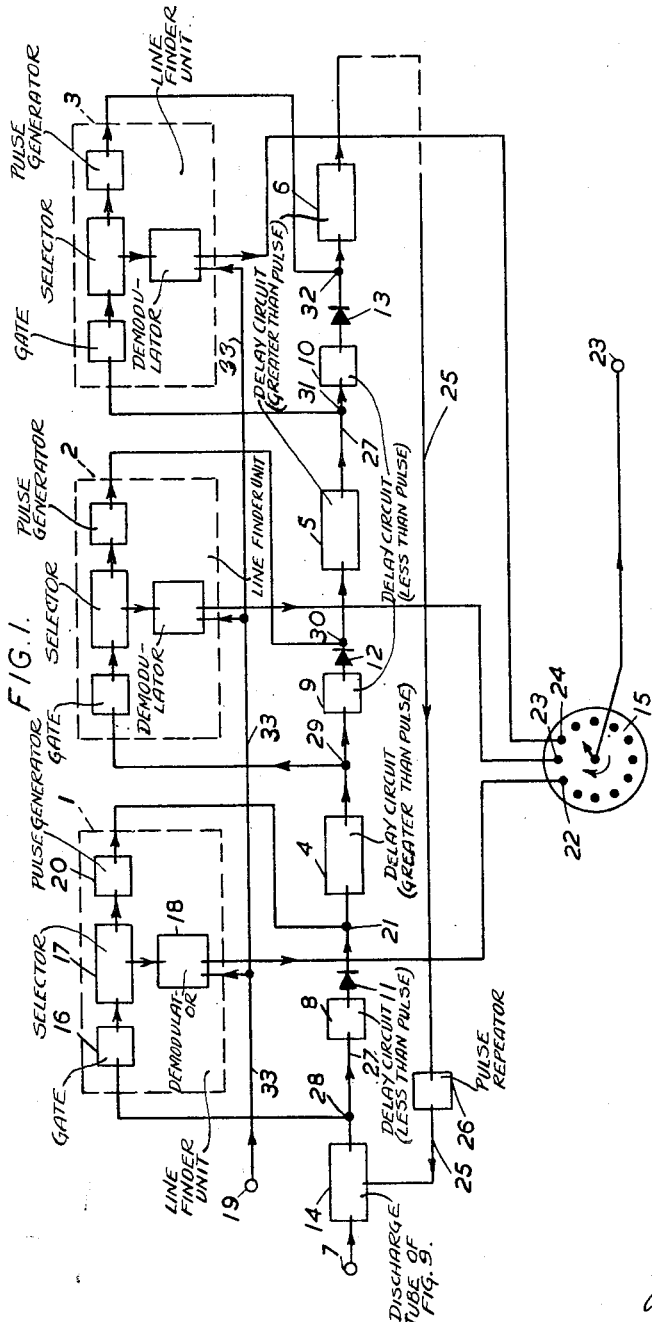

March 10, 1953

A. H. REEVES 2,631,194

TELECOMMUNICATION SYSTEM

Filed July 21, 1948

3 Sheets-Sheet 1

Inventor
Alec Harley Reeves
By RPMorris
*Attorney*

March 10, 1953     A. H. REEVES     2,631,194
TELECOMMUNICATION SYSTEM
Filed July 21, 1948     3 Sheets-Sheet 3
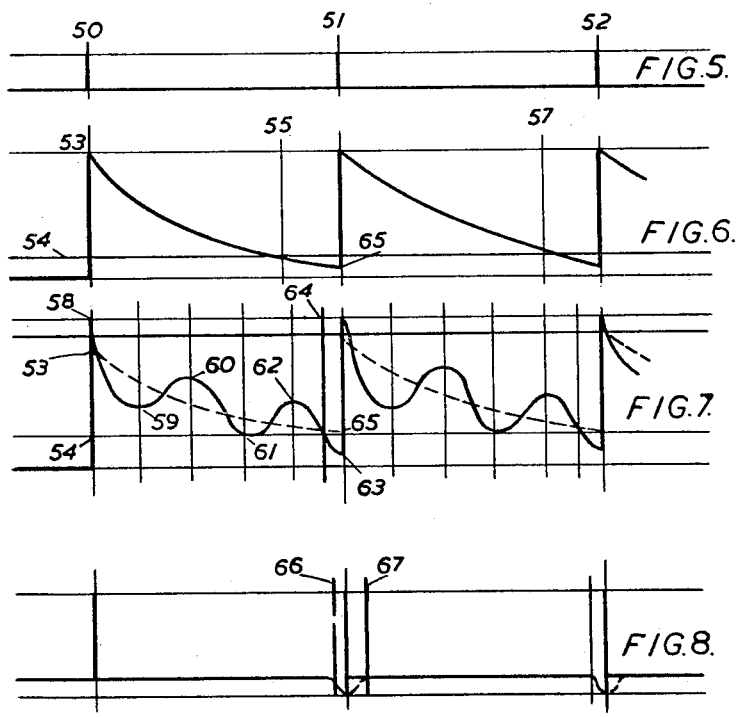
Inventor
Alec Harley Reeves
By RPMorris
Attorney Patented Mar. 10, 1953

2,631,194

UNITED STATES PATENT OFFICE 2,631,194

TELECOMMUNICATION SYSTEM

Alec Harley Reeves, London, England, assignor to International Standard Electric Corporation, New York, N. Y., a corporation of Delaware Application July 21, 1948, Serial No. 39,935
In Great Britain July 22, 1947

5 Claims. (Cl. 179—15)

This invention relates to pulse transmission systems, particularly those systems wherein signals are conveyed along a communication path in the form of pulses of electrical energy, the amplitude, duration, phase or timing of which is varied, that is to say, modulated, in conformity with the instantaneous value of signals representing the information to be conveyed.

In such systems, it has been arranged that the signals from each of several substations to the system are caused to modulate at a central station a pulse of electrical energy (hereinafter called a "pulse") having a time position in a recurring cycle of pulses, so that the pulse time positions allotted to the substations recur in cyclic order.

The precise time at which the pulse of a substation occurs in relation to the cycle of pulses may be varied within certain limits when the type modulation of the pulse by the substation's signals is such as to vary the timing of the pulse, and this modulation may vary the pulse timing about a constantly recurring mean time position in the cycle of pulses. Further it has been proposed in United States application No. 756,262, filed June 21, 1947, to vary the timing of the pulse by modulation not in relation to the start or finish of a cycle of pulses but in relation to the pulse immediately preceding it, allotted to another substation.

Where a number of substations as aforesaid are to be served by a lesser number of connecting circuits or channels, it is necessary in a pulse transmission system of the type described, to make any free connecting circuit or channel available to any of the substations from which transmission is required.

According to one of its features therefore the invention consists of a pulse time transmission system comprising means for selecting pulse times from a first pulse repetition time cycle and means for transferring modulations carried by selected pulse times to a corresponding number of pulse times in a second independent and unrelated pulse repetition time cycle.

According to another of its features, the invention consists of a telecommunication exchange which comprises means for modulating pulses in a pulse repetition time cycle with calling or selecting signals and clearing signals from a substation and comprising line finder means for responding to a calling or selecting signal to cause selection of a substation and means for responding to a clearing signal on the same pulse time to cause disconnection of the said substation.

The process of selecting a pulse time from a pulse repetition cycle is in many ways analogous to the functions of a "line-finder" in an electromechanical switching system and the term "line-finder" is used with reference to the means of effecting this selection in the following description of the invention, but the term is used solely for convenience of expression and is not intended to limit the invention to applications such as those carried out by linefinders in the telecommunication field.

The nature of the invention will now be described in relation to an embodiment illustrated in the attached drawings in which:

Fig. 1 is a block schematic drawing of a system according to the invention.

Figure 2:
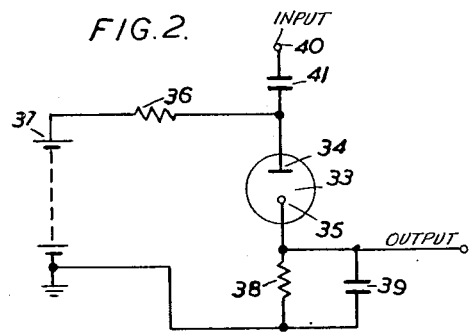
Figure 3:
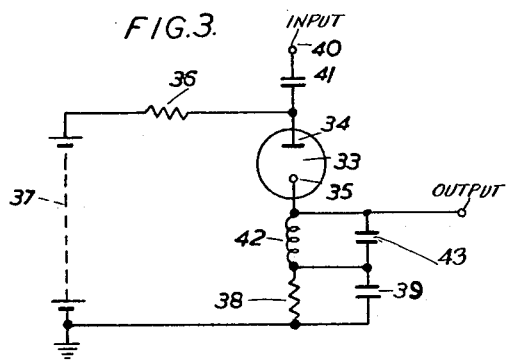
Figure 4:
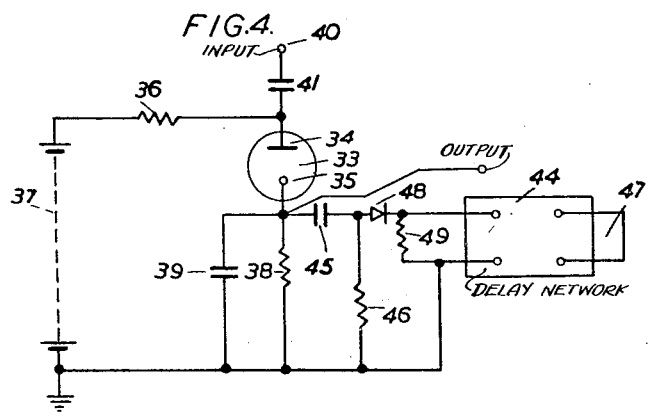

Figs. 2, 3 and 4 are circuit diagrams of alternative types of unit representing the rectangle 17 or 16 and 17 in Fig. 1.

Figs. 5, 6, 7 and 8 are graphs of the waveforms at various points of the circuits illustrated in Figs. 2, 3 and 4.

In Fig. 1, the dotted line rectangles 1, 2 and 3 are three linefinder units connected at points 28 and 21, 29 and 30, and 31 and 32, respectively, to a looped line indicated by the reference numeral 27 where it goes in one direction and by the reference numeral 25 in the return direction. A number of linefinder units connected in this way to a looped line, will be called a "line-finder group."

In line 27, following the points of attachment of the linefinder units 1, 2 and 3, are inserted delay circuits 4, 5 and 6 respectively the delay times of which are equal to one another but greater than the duration of a pulse.

The pulses representing the various substations connected to the system are introduced at terminal 7, whence they enter a unit 14 to be described later, from which they are applied to line 27.

Delay circuits 8, 9 and 10 are inserted in line 27 between the points of connection, 28, and 21, 29, and 30, and 31 and 32 of linefinder units 1, 2 and 3 respectively. The delay time of these delay circuits is less than the duration of a pulse.

Between delay circuits 8, 9 and 10, and connection points 21, 30 and 32 respectively, unidirectional devices 11, 12 and 13 are inserted in line 27.

Each linefinder unit consists of 4 circuits shown with numerical references in linefinder unit 1, the other linefinder units having similar circuits. These circuits are a gate circuit 16, a selector 17, a demodulator 18 and a pulse generator 20.

The demodulators 18, of the linefinder units are connected individually to separate scanned elements of a continuously scanning distributor device 15 which will usually be common to a number of linefinder groups and will have its scanned elements occupied by connections from linefinder units in these groups similar to that illustrated in Fig. 1. Though in certain circumstances it may serve one linefinder group only this will usually be undesirable for economic reasons.

Fig. 1 shows only three linefinder units 1, 2 and 3 but of course there may be more of them in a group.

Each group serves a number of substations to the system whose signals are applied to terminal 7 and there will in general be fewer linefinder units in the group than there are substations served by the group. The ratio of linefinder units to substations will be based on the anticipated calling rate and may be of the order of 1:10 for instance.

A source of pulses provides a recurring cycle of pulses and each pulse of a cycle constitutes a channel allotted to one of the substations to the system, the communication signals of each substation being caused to modulate only the recurring pulses allotted to that substation.

There are many ways known to the art of allocating a number of substations to individual pulse times in a recurring cycle of pulses, one method being to connect them to individual target elements of a cathode ray tube distributor of the type described in United States application, Serial No. 628,613, filed November 14, 1945. A distributor such as that described in United States application, Serial No. 777,818, filed October 3, 1947, may also be used.

In the embodiment described, the modulation of the pulses by the communication signals of the substations takes the form of time modulation either about a reference time which is constant in relation to the pulse cycle or with the pulse of another channel as the reference points. The calling and clearing down conditions, are however, impressed upon the pulses in the form of duration or amplitude changes of fixed magnitude.

In the absence of signals from any of the substations, the pulse trains are continuously applied to terminal 7 of the linefinder group and are of an amplitude level which will be hereinafter called "level A."

On the commencement of a call by a substation it is arranged that one pulse on that substation's channel shall have a greater amplitude than level A which will be hereinafter called level B. After this one pulse, the pulses of this channel then continue on level A.

It may be arranged that pulses of different duration are substituted for pulses of difference level, for this calling process, and it may further be arranged either that the linefinder units respond to a pulse of increased duration or alternatively that such increased duration is converted into an increased amplitude between terminal 7 and the connections to the linefinder units.

Since there are many ways known to the art, of varying the amplitude duration, or timing of a pulse allotted to a substation in a recurrent pulse cycle, in the form of modulation, the provision of these difference types of pulse for calling etc. which is also of the nature of modulation, present no difficulty and as no claim is made to the means of modulating the pulses, they will not be described.

The operation of the group will first be described on the assumption that all linefinders are free and the description will relate to linefinder unit 1 as representative of any linefinder unit.

The combined functions of gate circuit 16 and selector 17 are a. To respond initially to a pulse on level B from a calling channel, b. To continue to respond thereafter to pulses on the same channel of level A but to be unresponsive to pulses of other channels of any level, c. To pass a pulse on the same channel, once per cycle, to the demodulator 18, varying in timing to the extent of any time modulation of the pulse by the substation's signals, and d. To remain responsive to the pulses of the said channel provided that there is no break in the regular arrival of one pulse of level A or greater in every pulse cycle.

The functions of gate circuit 16 and selector 17 may be combined in one device which may take the form of a time measuring circuit, capable of being started from the quiescent state by a pulse of level B only, and thereafter requiring to be re-triggered once per pulse cycle by a pulse of level A or greater. It must be unresponsive to intermediate pulses on other channels.

With such a device, a pulse can be generated in the device or a gate may be opened permitting the passage of the channel pulse from line portion 27 at the appropriate timing, such pulse being passed to demodulator 18.

Alternatively the one device may consist of a counting circuit which initially starts to count to a radix equal to the number of pulses in the pulse cycle, on receipt of a pulse at level B only and thereafter continues to count pulses of any level above a chosen minimum but ceases to count when the pulse of the channel to which it is synchronised falls below level A, to a lower level C, to be described later. A recurring pulse at the timing of the pulse of the channel in question will be passed to demodulator 18.

It will sometimes be desirable however, to have separate circuits for 16 and 17 and in such cases 16 may be a gate circuit initially triggered by a pulse at level B and when operating, it may either pass a pulse to 17 once per pulse cycle on the channel of that B pulse, so long as it receives pulses regularly on that channel once per cycle, of level A or greater. Alternatively it may pass the pulses of all channels so long as it is periodically triggered by a pulse of level A or greater, on the channel to which it is synchronised.

In such cases, 17 may be a time measuring circuit or a counting circuit capable of passing a pulse to demodulator 18, at the timing of the required channel, once per cycle so long as 16 continues to operate.

Circuits for the purpose will be described hereafter by way of example. The circuits described in United States application Serial No. 777,761, filed October 3, 1947, as a delay circuit and a delay gate are used in a comparable role and could be used also in the role of gate circuit 16.

Demodulator 18 is a pulse time demodulator and may be of any known type, for instance, when the pulses are modulated in relation to a constant time reference point, it may include a double stability pulse gate in which case it may be arranged that a series of evenly spaced pulses hereinafter called "master pulses" of the same frequency as the channel pulses, are applied to it having a timing so that they arrive at demodulator 18 slightly after the latest time of arrival of a channel pulse delayed to the maximum extent by modulation. It could then be arranged for the selected channel pulse to operate the gate in one sense and the succeeding master pulse to operate it in the other sense, the distance between the two being converted by integration equipment also forming part of 18, into signals corresponding to the signals of the calling channel, without the pulse component, that is, in the case of speech signals for instance, to continuous audio frequencies.

These master pulses could be applied to demodulators 18 of the linefinder units via a terminal 19 and connection 33.

Demodulator 18 has a connection to one scanned element of distributor 15 and when the process so far described has been completed, the calling substation has been allotted to one of the several possible outlets from distributor 15 as will now be described. Distributor 15 may be an electronic distributor of the cathode ray tube type as described in United States application Serial No. 628,613, filed November 14, 1945, or of the multi-gap cold cathode tube type as described in United States application Serial No. 777,818, filed October 3, 1947.

The output from distributor 15, emerging at terminal 23, consists of pulses, recurring in a repetitive cycle, each cycle having a number of pulses depending upon the number of pulses of scanned elements in the distributor. Each pulse of a cycle is individual to a linefinder unit and when a calling substation has been connected to a unit, in the manner above described, the corresponding pulses in each cycle of distributor 15 will be modulated by the signals applied to the corresponding scanned element of distributor 15 from demodulator 18 of the linefinder unit.

It will be observed that the pulse emerging from the common element of distributor 15 has been transferred to a different timing in a different cycle of pulses which need bear no relation to the original cycle of pulses entering at terminal 7. As there are fewer linefinder units than there are substations it follows that a time cycle of a given number of pulses can be used, beyond the linefinders, to serve a much larger number of substations. If the ratio of 10 to 1, substations to linefinder units, is adopted the number of substations which can be served beyond the linefinder units for a given speed of pulse repetition, has been multiplied by 10, as compared with the substations which could be served by the same speed of pulse repetition if each substation had an individual time position permanently allotted to it, in the pulse cycle at terminal 23.

It is necessary to ensure that the calling pulse at level B operates only the one linefinder unit.

Pulse generator 20 is arranged so that a pulse of level B applied to it via 16 and 17 causes it to generate a pulse of an amplitude equal to the difference in amplitude between level A and level B, but of opposite polarity. This pulse is applied to the looped line 27 at point 21. It is arranged that the delay period of delay circuit 8 is equal to the overall delay imposed upon pulses in their passage through 16, 17 and 20 in the linefinder unit, so that the pulse from pulse generator 20 coincides exactly in time with the B level pulse to which it owes its origin, when the said B pulse has travelled by the direct path along looped line 27, through delay circuit 8 and unidirectional device 11. Beyond point 21 therefore, there will be no B level pulse as it will have been reduced to level A by the opposing pulse from 20. Therefore, no other linefinder unit can operate in response to this B pulse.

Pulse generator 20 does not operate from any pulse below level B.

It has now been seen how the first linefinder unit "finds" a calling substations' call and directs it to an outgoing path via distributor 15.

The consequences of another call from another substation whilst the linefinder unit 1 is occupied with the first call, will now be described.

A pulse at level B from another calling substation will have a different time position in the pulse cycles applied to terminal 7. It will, therefore, be blocked by gate circuit 16 of linefinder unit 1 and will therefore not be neutralised by an opposing pulse from pulse generator 20 of that linefinder unit. It will, therefore, pass, via 8, 11, and 4 to connection point 29 and gate circuit 16 of linefinder unit 2, which will respond to and synchronise with it.

The same sequence of operations as that above described in relation to the first call will now take place in linefinder unit 2, and connection to element 23 of distributor 15 will be established.

If a third call originates while linefinder units 1 and 2 are still occupied, it will be "found" by linefinder 3, and so on down the line of linefinder units in the group, from left to right in Fig. 1.

If, however, linefinder unit 1 becomes free and a fourth call originates, whilst line finder units 2 and 3 are still occupied, linefinder unit 1 will "find" this fourth call as its gate circuit 16 is free to respond to the B level pulse.

It is thus seen that an incoming call is "found" by the first free linefinder unit from the left, in Fig. 1.

When a calling substation terminates the call, it is arranged that one or more pulses on its channel are reduced from level A to a lower level C. This level is insufficient to re-trigger gate circuit 16 of the linefinder unit it has been using and this gate circuit reverts to its normal unresponsive state from which it can only be changed by a new calling pulse at level B.

The description now reverts to the first call above described. The channel pulses at level A, which succeed the original calling pulses at level B, reach the point 21 after passing through delay circuit 8 and unidirectional device 11 and will meet no opposing pulses from pulse generator 20, at connection point 21. Thence they will pass from left to right along the outward going portion 27 of the looped line, passing through the delay circuits 4, 9, 5, 10 and 6 and unidirectional devices 12 and 13 in the order 4, 9, 12, 5, 10, 13 and 6. They will then return to a unit 14 to be described later along the homecoming portion 25 of the looped line and via a pulse repeater circuit 26, also to be described later.

The returning pulses have been delayed by the delay circuits 8, 4, 9, 5, 10 and 6, and by the looped line itself in their passage round the looped line and it is arranged that each shall coincide, at the point 28, with a later pulse of the same channel.

The unit 14 ensures this. The said delay circuits and looped line are arranged to have a total delay equal as nearly as possible to the pulse cycle time, or a multiple thereof, so that if possible some part of a returning pulse will coincide with some part of a later pulse of the same channel. This is capable of achievement when the number of channels is small, without unduly close tolerances for the various circuits through which the pulses pass.

Where this is the case, unit 14 can consist of a pulse gate, in the form, for instance, of a limiting amplifier to which the direct pulse input from terminal 7 and the returning pulse from portion 25 of the looped line are applied in series aiding. Such an amplifier would have a standing bias such that where both pulses were at level A a single pulse at level A would be produced in the output, but where one of the pulses is at level B and the other at level A an output at level B would be produced. An original calling pulse from terminal 7, will, therefore seize a linefinder unit if one is disengaged, and will return along the homecoming portion 25, of the looped line as an A level pulse, due to the neutralising action of 20 in the linefinder unit concerned. The original B-level pulse will meet a previously transmitted A-level pulse in unit 14 and a B-level pulse will be sent to the linefinder units. A pulse at level B can only be received over the homecoming portion 25 of the looped line if a call is received when all the linefinder units of the group are occupied and there is little likelihood of it coinciding in unit 14 with a B level pulse received via terminal 7 since the indirect B level pulse will coincide with a later direct pulse from terminal 7 which will have reverted to level A after the single calling pulse at level B, in which case the circuit would still send on a B pulse in response to the simultaneous B pulses received. The operation necessary to produce the calling signal at the substation, would have to be repeated twice in succession at pulse channel frequency to cause consecutive B pulses and if it is a manual operation the likelihood is so remote as to be ignored but with an automatic call device, precautions to obviate the possibility may be desirable. When all the linefinder units are thus engaged, the returning B-level pulse from 25 will cause a B-level pulse to issue from unit 14 and this B-level pulse will continue to circulate round the looped line till a linefinder unit becomes free and "finds" it. After this, it will be neutralised by 20 of the linefinder unit concerned and will return to unit 14 over line portion 25 at level A.

If the unit 14 receives a pulse or pulses at level C from terminal 7 they will be combined with returning pulses at level A, from line portion 25 as it is arranged that C level pulses are reconverted to A level pulses by amplifier 26 for reasons and in manner to be explained.

The combination of a level C pulse and a level A pulse in unit 14 results in an output at level C which fails to trigger gate circuit 16 of the linefinder unit hitherto occupied. Several C pulses may be transmitted to clear down the connection to make sure that the linefinder unit does not accidentally retrigger. It is necessary to ensure however that the C level pulse does not return at level C along line portion 25 because C pulses would then issue from unit 14 even after level A pulses were resumed at this channel timing from terminal 7, and this would continue indefinitely so as to debar the subscriber allotted to the channel in question, from making another call.

The amplifier 26 is arranged to cater for this requirement. It may be a pulse amplifier having two limiting peak output amplitudes; at level A for a received pulse at or between levels A and C and at level, B for an input above level A.

It is necessary to insert amplifier 26 to fulfil the function just described and also to stabilise the level of pulse returning along line portion 25 and restore any loss of amplitude incurred en route round the looped line and the various inserted delay circuits etc.

It may be necessary to alter the timing and duration of the returning pulses from line portion 25 so that coincidence with some part of a succeeding pulse on the same channel is achieved. Time modulation of the pulses might otherwise alter their position sufficiently to cause a failure of coincidence in unit 14 without this precaution. This may be done in amplifier 26 or unit 14 by well known means and it is preferable to provide a square pulse of a duration such that it just cannot overlap the pulse (from terminal 7) of another channel with maximum modulation time displacement of the latter and having regard to variations of timing of the square pulse due to manufacturing tolerances.

It is necessary to prevent any feeding back of pulses in the reverse direction (anticlockwise round the looped line as drawn in Fig. 1) and accordingly the unidirectional devices 11, 12 and 13 are inserted. They may be metal rectifiers for instance.

Pulses of reduced width, may, if desired, be used instead of pulses of the reduced amplitude C and in this event the linefinder units would have to differentiate between pulses of different duration or else such different pulse duration could be converted to different amplitudes between entry at terminal 7 and the connection points of the linefinder units to portion 27 of the looped line. This could be done by unit 14.

So far the embodiment of the invention has been described in its broad outline. Its practical details, however, will depend upon the conditions in which it is to be used.

Three main sets of conditions are envisaged and several forms of apparatus suitable under these conditions, for carrying out the functions of the various elements shown in Fig. 1, will be described by way of example.

The three sets of conditions are as follows:

1. Where there is a relatively small number of substations incoming to a linefinder group each having a pulse timing varying, when modulated by communication signals, about a constant mean time position in relation to the pulse cycle serving these substations. These circumstances will be referred to as "case 1."

2. Where there is a large number of channels with modulation of the pulses about a constant mean time position as in "1." These circumstances will be referred to as "case 2."

3. Where the timing of the pulses may be varied, by modulation, in reference to a datum which is not constant in relation to the cycle of pulses (for instance as described in United States application, Serial No. 756,262). These circumstances will be referred to as "case 3."

In case 1, the linefinder units may have the function of delay circuit 16 and/or selector 17 fulfilled by a simple triggered delay device having a restoring time slightly less than the recurrence periods of the pulses of any one channel but not so short as to be capable of being triggered by the pulse of a preceding channel.

In commercial practice a 1% tolerance would be adequate to meet this requirement in the case of a linefinder group serving about 10 substations and this should not be difficult of attainment.

In case 2, which might be taken to apply to linefinder groups having more than about 10 incoming channels, there would be considerable difficulty in ensuring the necessary reliability of operation if a trigger delay device were to be used and a counter circuit would be preferable in the role of gate circuit 16 or selector 17 (or both), since it would record the pulses by counting and would be independent of their timing.

In case 3, a counter circuit is essential for 16 and/or 17, as the timing of pulses of different channels would be certain to overlap between successive cycles unless the time spacing between pulses was made extremely large in relation to the pulse width.

Circuits suitable for case 1 will now be described.

It has already been indicated that a delay circuit such as that described in United States application Serial No. 777,761 could be used as delay circuit 16 and/or selector 17 in a linefinder unit. Other devices using cold cathode gaseous discharge tubes are illustrated in Figs. 2, 3 and 4. In these three figures corresponding items have been given corresponding reference numerals.

Figs. 5, 6, 7 and 8 are graphs of the wave forms at various points in the circuits illustrated in Figs. 2, 3 and 4. Corresponding things having the same numerical references throughout these four Figures 5, 6, 7 and 8.

A simple circuit, using a gas tube is shown in Fig. 2. The cold-cathode gas-filled diode 33 has an anode 34 and a cathode 35. 34 is connected via resistor 36 to the positive end of a battery 37, the negative end of which is grounded. Cathode 35 is connected via resistor 38 to ground. Resistor 38 is shunted by condenser 39. The battery 37 is adjusted so that the gas tube will not fire without the assistance of the positive pulse next referred to.

At time 50 of Fig. 5 a positive pulse arrives from the incoming line at terminal 40 of Fig. 2 and is applied to the anode 34, via condenser 41. The gas tube fires and the voltage at cathode 35 will rapidly rise from zero to a level 53 as shown in Fig. 6. The rise in voltage lowers the effective potential across the electrodes of the tube and the discharge is immediately extinguished. This phenomenon is described in detail in our copending United States application Serial No. 19,083/48, filed April 5, 1948 wherein the voltage surge followed by the extinguishment of the tube is called a "squeg" and this expression will be used hereinafter to describe the phenomenon. On extinguishment of the discharge the voltage at cathode 35 falls exponentially to a level 65 at time 51 in Fig. 6. It is arranged for the voltage at cathode 35 to be still falling appreciably at time 51, but at this time to be below the critical value 54 to allow the tube to be re-fired by the second input pulse at or after time 51. The tube will thus be re-fired, the volts at cathode 35 (Fig. 2) again rising to a level 53, when the tube will squeg once more.

The tube can be fired by an input pulse anywhere between times 55 and 51 (Figs. 6 and 5) or between 57 and 52—during which intervals the cathode volts on condenser 39 have leaked away sufficiently. The stability of the restoring time-constant will depend directly on the slope of curves 53—65, Fig. 6, at time 55 where retriggering is to be again possible.

In Fig. 6, this slope is relatively small; therefore it would be difficult to meet the necessary tolerance even for a small number of channels. Even a small change in battery volts etc., might cause the tolerance figure to be exceeded. A change in the value of resistor 38 or condenser 39 in the circuit of Fig. 2, moreover, will give a first order change in the time constant—and high stability resistors and condensers are in some cases too expensive to be commercially practicable. The circuit of Fig. 2 is described principally because it is the basic circuit, of which those shown in Figs. 3 and 4 are improvements. It may, of course, be adequate as it stands for certain applications.

A trigger circuit meeting the conditions more readily is shown in Fig. 3. The only change from Fig. 2 is the addition of the anti-resonant circuit consisting of inductances 42 and condenser 43, between the cathode 35 and the ungrounded end of resistor 38. When the first input pulse now arrives at time 50 on terminal 40, the cathode volts will first rise rapidly from zero as before; but in falling again after the squeg (due again to 38 and 39), the voltage wave on 35 will have two components:

a. The exponential fall 53—65 of Fig. 7 (shown by a dotted line), due to leakage of condenser 39 (Fig. 3) through resistor 38; from level 53 to level 65, this latter level being now arranged to be of higher value than in Fig. 5 and b. The lightly damped sinusoidal wave due to shock excitation of tuned circuit 42—43 by the voltage rise. The resultant voltage wave at 35 is shown by the full line 58—59—60—61—62—63 in Fig. 7.

The natural half period of anti-resonant circuit 42—43 is adjusted to be a suitable odd integral fraction of the time interval 50 to 51 (Fig. 5) approximately.

The resistor 36 has a relatively low value in the circuit of Fig. 3. On re-triggering at time 51, therefore, the remaining energy in the damped train will be substantially damped out by the low tube impedance on firing and the circuit 42—43 will be shock-excited again by the voltage surge when the tube fires. The wave 58—59—60—61—62 in Fig. 7 will then be repeated.

The slope at time 64, at which this latter curve first crosses critical level 54 for the re-firing of the tube by the input pulses, is now much steeper than at time 55 of Fig. 6; the time constant stability against any undesired changes in circuit constants, including changes in values of 38—39 will be correspondingly increased, the only factor now giving a first order change in this time constant is the natural frequency of circuit 42—43, and it is, in general, cheaper to obtain an inductance stable within certain limits than a resistor stable within these same limits. Changes in condenser 43 will again give first order changes; but a high stability condenser in general is again cheaper than a high stability resistor, at any rate when the resistance value is of the order of several hundred thousand ohms at least, as it might have to be in many applications of this device.

The level of the sine-wave ripples on curve 58—59—60—61—62—63 may be adjusted suitably with respect to the exponential component 53—65 by suitably arranging the anti-resonant impedance of 42—43 with respect to the impedance of the combination 38—39. If the ripples are of two low a value, they will have little effect, and the result will be much the same as in curve 53—65 in Fig. 6. If they are of too high a value, or if the natural frequency of 42—43 is too high, it may give a trough on the curve that is too near the critical level 54 making the input pulse just before the desired one liable to trigger the tube. A suitable compromise is therefore chosen.

The circuit of Fig. 3 might be expected to cater for channels in number up to about 8, with normal commercial tolerances in components.

In extension of the same expedient, it is possible to use several tuned circuits in cascade instead of a single tuned circuit.

For example, one tuned circuit may have 5 half periods in the interval 50—51 of Fig. 5, and a second tuned circuit 15 half periods. This gives a higher slope for curve 58—59—60—61—62—63, without bringing this curve too near the critical level 65, on the input pulse immediately preceding the desired pulse.

A device similar to that of Fig. 3, is described in U. S. Patent No. 2,462,078.

A further improvement in time constant stability may be obtained by using the circuit of Fig. 4.

The circuit is similar to that of Fig. 2 except for the addition of certain components in parallel with condenser 39 and resistor 38.

A delay network 44 is now connected between cathode 35 and ground, via small condenser 45. The end of condenser 45, furthest from the connection to cathode 35 is connected to ground via resistor 46. The output terminals 47 of the delay network 44 are short circuited. A rectifier 48 is connected in series between condenser 45 and one input terminal of the delay network 44 and a resistor 49 is connected in parallel with the input terminals of the delay network.

The first input pulse (hereinafter called the "starting pulse") at time 50 Fig. 5 will cause the tube to fire and squeg as before. During the sharp rise of cathode current a sharp positive pulse will appear across 46—this will correspond to the derived curve against time of the current rise in the cathode load 38, the values of 45 and 46 being so adjusted. The starting or B level pulse at time 50 is arranged to be of higher peak voltage than the subsequent input pulses, which are of constant lower amplitude A. These subsequent pulses are arranged to be of insufficient amplitude, added to the voltage of battery 37, to trigger the tube, even when the charge on 39 due to the sudden rise of voltage, has died away after the squeg. The time constant of 38—39 is adjusted so that this charge on 39 has died away substantially to zero in a time small compared with that between input pulses. Owing to rectifier 48 the fall in cathode current will give no negative pulse across 49, as the rectifier 48 blocks currents in that direction.

The pass band of delay network 44 (a low-pass filter of conventional design for example) and its phase characteristics, are such that after reflection at the short circuited terminals 47, the sharp positive pulse due to the sharp rise of cathode current at time 50 is transformed into a longer negative pulse of smaller peak amplitude across the input end at resistor 49, due to the low-pass characteristics of the delay network 44, and this longer negative pulse will be developed across the resistance 49 after reflection from the short circuiting connection 47, and repassage through delay network 44 in the reverse direction. The pulse will undergo a delay equal to twice that of 44. This delay is arranged to be such that the beginning of the reflected negative pulse on 49 occurs at time 66, Fig. 8—at a time corresponding to earliest timing of the leading edge of the next pulse to which the circuit is required to respond, for example, the next pulse of a given channel in the pulse cycles delivered to terminal 7, Fig. 1 (advanced to the maximum extent by time modulation for instance) i. e. at time 66 in Fig. 8. The end of the reflected pulse is arranged to occur at time 67, the time corresponding to the latest timing of the trailing edge of the next pulse on the same channel (retarded to the maximum extent by time modulation, for instance).

The adjustments are such that only between times 66 and 67, when the reflected pulse arrives back at cathode 35 via rectifier 48 and condenser 45, is the cathode sufficiently negative to enable a pulse to trigger the gas tube and intermediate pulses will have no effect. Condenser 39 has a higher value than 45 to enable substantially the whole of the reflected pulse to pass from right to left across condenser 45 without differentiation, while as the positive pulse passes across 45 from left to right only the derived pulse wave form is obtained across 46.

This circuit of Fig. 4 has two advantages over the circuits illustrated in Figs. 2 and 3:

1. The time constant of the delay network 44 is substantially the only determining factor in the tube restoring time, and 2. This restoring time is determined only by the tube triggering time, and not as in the previous cases by the shape of the curve representing the current through the tube.

This is an important point, as the triggering time of a normal gas tube, dependent as it is on the ionisation time-constant of the gas, is always more definitely determined than the moment of extinguishing during a squeeze, which depends on the de-ionising time-constant which is normally less well determined.

The restoring stability of the circuit of Fig. 4 may thus be substantially higher than the two previous circuits. It might be used in a line-finder group having about 20 channels, for example, without unduly expensive components, or special selection of gas tubes. The only item that has to be designed to fairly close tolerances is the network 44 of which the delay time is the most important factor.

In case 1 the selector 17 may consist, for example, of the arrangement of Fig. 3. The input (positive) pulses (every pulse in the cycle) are applied at terminal 40, and an output pulse is taken from the cathode (also positive pulses) once per cycle. The function of gate circuit 16 can also be fulfilled, with no additions. Once the gas tube is extinguished it can be arranged that only a pulse at level B can first fire it. At a channel recurrence frequency of 10 kc., which would be suitable in the case of speech signals for instance, it is found that such a tube can easily be designed so that when once fired the residual ionisation present when the second pulse of a given channel arrives, causes the tube to be fired also by pulses at the lower level A, but not at the still lower level C. If one pulse is missed, however, and there is a gap of two cycle periods before a pulse at level A or B appears (as at disengaging) the residual ionisation will have died away sufficiently to prevent re-firing except by a level B pulse.

Alternatively, the arrangement of Fig. 4 may be used, in this case it is unnecessary to rely on residual ionisation for re-firing by a pulse at level A, after first firing by a pulse at level B; the reflected pulse from delay network 44 may easily be arranged, so that in conjunction with an input pulse at level A it will refire the tube.

The de-ionisation time may, therefore, be lowered. There will be no reflected pulse once a pulse has been missed, as the tube will not fire and there will be no voltage developed across 38, to be reflected. Therefore, a level B pulse (being the "starting pulse" of Fig. 4), will be needed for re-firing.

When the tube of Fig. 3 or 4 first fires (from a level B pulse), the output pulse on the cathode will be at a higher level than at subsequent times (from level A pulses), as the anode has to be raised to a higher potential before firing takes place.

A rectifier in series with a suitable opposing battery may be shunted across 38 to limit the peak volts of the cathode pulse always to the same level as is given by a subsequent firing from level A—otherwise in the case of Fig. 3 it will be difficult to keep the wave-form of the voltage across the cathode (see Fig. 7), the same in both cases, and to prevent the restoring time-constant from being changed unduly and in the case of Fig. 4, the reflected pulse from 47 will be at a higher level on first firing, thus making the tube liable to re-fire the next time after the initial firing, before the channel signal pulse arrives or even on a previous pulse belonging to another channel.

This added rectifier across resistor 38 may also be used to fulfill the function of the unit 20 of Fig. 1. Current will only flow through it on first firing, from a level B pulse. By means of a pulse transformer, for example, it may then be arranged that when this current pulse (which will have a constant level) occurs in the rectifier, the required opposing voltage is applied at points 21, 30 or 32 (according to the linefinder unit which "finds" a call), to reduce the direct signal pulse at level B, from 11, 12 or 13 in Fig. 1, to the required level A.

It is possible also to use a low pass filter as a demodulator 18, and when this is done the time modulation of the pulses from selector 17 must first be changed to amplitude modulation. This may be accomplished by applying the pulses in series with a source of sawtooth wave form, the saw teeth having a recurrence frequency equal to the channel frequency and timed so that the pulses occur during the sloping portion of the sawtooth wave form. The sawtooth wave form may be produced by a source common to several linefinder groups and may be applied to terminal 19 (Fig. 1).

Cases 2 and 3 will now be considered together as, though they relate to different circumstances, they are capable of the same solution.

In case 2, where a large number of channels is served by one linefinder group, it may be commercially impracticable to use the circuits of Figs. 2, 3 and 4, as the timing of the moment when the tube is capable of being re-fired can only be accurately determined by using components made to close tolerances. If this timing were insufficiently accurate, the tube might well fire on the pulse of another channel and the call would be lost.

In case 3, where the channel pulses are modulated not in relation to a constant time instant in the pulse train but in relation to the preceding pulse belonging to another channel, it may be fundamentally impossible to ensure that the tube re-fires on the correct pulse. In systems using this type of modulation the pulse of a channel may vary in relation to the pulse cycle, from one limit determined by the cumulative total of the advancement of all the channel pulses in the pulse channel, advanced to the maximum by modulation, to another limit determined by the cumulative total of the delay of all the channel pulses in the pulse cycle, delayed to the maximum by modulation.

The time excursion of later impulses in the cycle is therefore considerable, and may well occur at timings occupied at other times by the pulses of channels removed several places from the pulse in question. In cases 2 and 3 therefore it is desirable to use a pulse counting device in the roles of gate circuit 16 and/or selector 17 so that the pulses of a given channel are identified independently of their timing in relation to the pulse cycle.

The functions of 16 and 17 can be fulfilled by multi-gap cold cathode gas tube counting devices such as those described in my United States applications Serial Nos. 777,815 and 777,816, both filed October 3, 1947. These tubes have a number of discharge gaps across which successive pulses are applied in common, one gap being arranged to fire from the first pulse of a cycle by various alternative means described in the said specifications. Each successive pulse causes a new gap to fire due to the spread of ionisation from an adjoining gap fired previously. Finally when all gaps have fired, all the discharges are extinguished and the process is repeated. For use in this invention, the tube should have a number of gaps equal to the number of channels served by the linefinder group.

It can be arranged that the tube will only fire in its starting gap in the presence of a pulse at level B, when once it has been extinguished for a time long enough for the gas in the tube to become de-ionised, and that the tube will continue to operate in successive cycles from pulses of level A once fired initially by a pulse at level B. It can also be arranged that the tube will not fire on any of its gaps in the presence of a pulse at level C.

The tube would be used either alone fulfilling the combined functions of 16 and 17, in which case it would be arranged that, once started counting by an initial pulse at B level, it would continue to count pulses of levels A, B or C except that a pulse at level C would fail to fire the starting gap and would cause the tube to stop counting.

It could be arranged for an output pulse to be delivered to demodulator 18 once in every pulse cycle, so long as the tube was counting, on the firing of the starting gap. The pulses of other channels would thus be counted but not passed to 18.

With such devices, it would be necessary to arrange for the working conditions to be such that the state of residual ionisation needed to ensure the firing of the starting gap from an A-level pulse, when once the tube has been initially started from the quiescent state by a B level pulse, was located at a fairly steep part of the curve of ionisation plotted against time so that if an A pulse arrived substantially later than the latest normal pulse recurrence time the ionisation would have fallen below the level necessary to fire the starting gap from a pulse at level A. If this were not done, a clearing pulse at level C would cause the starting gap to miss that pulse but it might well fire from the next succeeding level A pulse of an adjoining channel, and the linefinder unit would lock itself to that later channel and continue to operate, instead of clearing the connection.

Alternatively the devices described in my copending United States application Serial No. 39,936/48 filed July 21, 1948 may be used. These devices will now be briefly described.

Three devices are described in my said United States application Serial No. 39,936/48 consisting of multipoint cold cathode gas discharge tubes with accompanying circuits which count pulses by means of the successive firing of a number of discharge gaps but in which no battery is required to maintain a constant potential across the gaps in the absence of pulses.

One of these devices causes a discharge to take place on one additional gap on every successive pulse, all gaps having once fired being extinguished between pulses and re-firing on succeeding pulses due to the residual ionisation of the gas due to the recent discharge from the previous pulse. A first pulse will fire a first gap which is shorter than the others. The other gaps are dimensioned and the constants are chosen so that they will only fire from a pulse when the gas within them is ionised.

A succession of discharges takes place and every pulse fires one more gap than the last, until all gaps are fired between one multipoint cathode of the tube and an anode. When these have fired and extinguished a further separate cathode hereinafter called the "penultimate cathode" fires from the next pulse together with all point of the multipoint cathode. The penultimate cathode will not fire off the next pulse however owing to a time constant circuit connected to it externally which reduces the pulse potential across the gap for a time. A last cathode has a large surface and the said pulse which failed to fire the penultimate cathode is arranged to arrive at this last cathode before it reaches the multipoint cathode owing to a delay circuit in the series between the pulse source and all cathodes but the last. The last cathode passes a surge of current due to its area, which drops the pulse voltage across a common lead and the delayed pulse has no time to fire the multipoint cathode, the gaps of which have not yet full de-ionised, and might otherwise have fired, but for the voltage drop due to the said current surge.

All gaps if the multipoint cathode will have been extinguished for two pulse periods before the next pulse and will have de-ionised to such a degree that only the shorter starting gap is in a position to fire when that pulse arrives.

Another of the said devices described in my said application Serial No. 39,936, filed July 21, 1948, is similar to that last described but is arranged so that gaps fire once only during a pulse cycle. This device includes a tube similar to the above but including, in addition a long smooth cathode approximately parallel to the anode, and passing close to all the other discharge gaps. The end of this smooth cathode furthest from the starting gap has a projection towards the anode.

Pulses are applied between all cathodes and the anode and each pulse starts a glow from the projection on the smooth cathode to the anode; this glow spreads rapidly along the smooth surface of this cathode.

When it reaches the starting gap the ionisation due to the adjacent glow from the smooth cathode causes the starting gap to fire from the same pulse. The other gaps were too large to fire without the assistance of ionisation from an adjacent discharge from one of the sequence gaps in addition to the pulse potential and ionisation spread from the smooth cathode.

All this happens during a single pulse and it is arranged that the glow can spread from end to end of the smooth cathode during about half the pulse duration.

At the end of the pulse the discharge in the starting gap and the glow, disappear.

A next pulse re-starts the glow which travels along the smooth cathode until it reaches the second gap next to the starting gap. This gap is able to fire in the presence of the leading edge of the glow plus the residual ionisation from the recent starting gap discharge nearby. When it fires, the current in a common cathode load causes a voltage drop which prevents the starting gap from refiring when the glow reaches it due to the voltage dropped in this cathode load.

The process is continued along the gaps in the tube and the last pulse of the cycle causes a heavy discharge in the last gap having the large cathode surface, following the discharge in the penultimate gap controlled by the time constant circuit. The delay circuit used in the other device described in United States application Serial No. 39,936/48 is not required here since previous gaps once discharged will not refire due to the voltage drop in the common cathode load. When finally the pulse which fired the last electrode has ended the multipoint electrode will have been quiescent for two pulse periods, the penultimate gap will be prevented from firing by its time constant circuit and the last gap itself has a time constant circuit to prevent it firing again for several pulses. The succeeding pulse after that which fired the last gap will therefore find no gap able to fire, notwithstanding the advancing glow from the smooth cathode, except only the starting gap. The counting sequence thus re-starts.

It is, of course, essential that the direction of the spread of the flow along the smooth cathode should be opposite the direction of advance of the discharges of the sequence gaps in the tube in order that one gap further on, shall fire off each succeeding pulse.

A third device described in my said co-pending United States application Serial No. 39,936/48 is similar in principle to that last described except that the tube is constructed so that the sequence gaps are provided by the intersection of two grid-like members with longitudinal sections of one at right angles to those of the other, the two being arranged in parallel planes spaced slightly apart. The advancing sequence discharges describes a to and fro course from one corner to the other of the two grid like members, one of which forms the anode and the other the cathode of the tube. A grid like smooth cathode causes a flow following the course of the discharge gaps in reverse direction and a separate anode plate co-operates with the smooth cathode in providing the glow.

Two final electrodes are provided, and the device operates, in the same manner as the last one described except for minor circuit differences due to the extra anode.

These devices can be arranged so that they will not commence to count when they have been quiescent for a time long in relation to the pulse cycle time, except in the presence of a pulse at level B.

In the first device, this is arranged by dimensioning the starting gap so that it will not fire in the presence of a level A pulse alone or a level A pulse aided by the ionisation remaining after a missed pulse.

In the second and third devices, where the starting gaps remain extinguished for practically the whole pulse cycle time after its initial firing it is easier to arrange that the smooth cathode will not commence to glow, except in the presence of a level B pulse, when it has been quiescent for a time long in relation to the pulse cycle time but will commence to flow in the presence of a level A aided by the ionisation remaining at the commencement of a pulse succeeding a pulse during which it was glowing.

In using these devices in linefinder units of the type described, they will fulfil the role of selector 17 primarily and once started by a calling pulse at level B will continue to count the pulses of all channels the starting gap requiring a pulse of level A, to cause it to fire and being unable to fire from a level C pulse, but all the other gaps being able to fire from a level A, B or C pulses when once the tube has started counting.

The functions of gate circuit 16 can readily be combined with these of 17, when these devices are used or alternatively it may be desirable to have a separate gate circuit which can only be opened from the quiescent state by a level B pulse, which remains open to all pulses so long as it is periodically triggered by a pulse of level A or greater on the calling channel but closes when the pulse of this channel falls to level C.

With such a separate gate circuit 16, it is easier to arrange for the clearance signal to stop the count of 17 than when the discrimination between A and C level pulses is confined to the starting gap, the others having to count pulses of all three levels.

As described in the said application Serial No. 39,936/48 these devices are arranged to deliver an output pulse on the firing of the last gap. For use in the role of 17 and or 16 in Fig. 1, however, the circuits and tubes need modification. The starting gap cathode point of all three types of tube must be connected to a separate leading out connection from that connected to the remaining points of the multipoint cathode and an output transformer winding must be connected between the starting gap cathode point and the common cathode lead instead of this transformer being connected in series with the lead to the last cathode.

Devices are known comprising a cold cathode gas tube and an accompanying circuit in which the tube contains two sets of discharge gaps made between two multipoint cathodes and two anodes.

The arrangement of the electrodes in the tube is such that one set of gaps commences to fire in succession by the discharge across a starting gap, in the first instance, followed by the spreading of the discharge from gap to gap, from successive pulses, until on reaching the last gap, which has a cathode element with a large surface a current surge causes a voltage drop in a common lead which, in turn causes the discharges in this set of gaps to be extinguished. They are unable to discharge again for the time of a number of pulses by a time constant circuit.

The starting gap of the second set of discharge gaps is not smaller in size than the other gaps, as is that of the first named set of gaps, and it is caused to fire in the presence of the pulse next succeeding that which fired the last gap of the first set of gaps, due to the ionisation of the gas therein, which it has received by migration from the last gap of the first set of gaps, these two gaps being near together though spaced somewhat further than the gaps of any one set of gaps. The second set of gaps then commences to fire in succession until, on reaching the last gap, the cathode element of which has a large area, a surge occurs which extinguishes the discharges. All this time the first set of gaps has been quiescent and is completely de-ionised by the time the second set of gaps is extinguished. The last gap of the second set of gaps is placed near enough to the starting gap of the first set of gaps for the latter to become ionised on the discharge of the former and the sequence of discharges in the first set of gaps therefore recommences on the arrival of the next pulse.

As described in the said application the output of the device is derived from the discharge in the last gap of the second set of gaps, but for use in the role of 17 and/or 16 of Fig. 1 the output must be derived from the discharge in the first or starting gap in the first set of gaps.

The dimensions of the starting gap of the first set of gaps is such that only a pulse at level B can fire the gap when not ionized but that it can be fired by a pulse at level A when ionised by the adjoining discharge of the last gap of the second set of gaps.

It must furthermore be arranged that, though the starting gap of the first set of gaps will fire from a pulse of level A, once the tube has started to operate, it will not fire from a pulse of level C. The other gaps however must all fire from pulses of level A, B or C so that the count is not lost when another channel sends a clearing pulse at level C.

This device has the advantage over the counters described in my United States applications Serial Nos. 777,815 and 777,816 in that a pulse rate can be employed of which the interpulse interval is too short to enable the gas in the tube to be de-ionised since one set of gaps has virtually the whole time taken by the sequence of discharges in the second set of gaps, to become de-ionised. It is obvious that if gaps in a set of gaps were not de-ionised at the beginning of a cycle of pulses, the gaps might all fire at once, or the first gap to fire might be one other than the starting gap.

The application of this device to a linefinder unit of the type described is exactly similar to the application of the devices described in U. S. application, Serial Nos. 777,815 and 777,816 explained previously.

All the devices above referred to described in my said copending application No. 39,936/48, when used to fulfil the functions of gate circuit 16 and selector 17 of Fig. 1 can, by the use of a rectifier connected to the starting gap, be made also to produce the neutralising pulse of pulse generator 20, since the B level pulse required to start the device from the quiescent state will cause a higher peak pulse voltage at the cathode than with subsequent A-level pulses.

In the design of demodulator 18, to suit case 2 certain problems may arise which are not likely to be encountered in case 1.

Many demodulator devices rely on the provision of a reference pulse with respect to which the variation of the signal pulse, due to time modulation, is measured. When such a reference pulse is applied to the demodulators of the linefinder units of a group, from a source common to the linefinder units of the group the delay circuits through which the signal pulses pass may cause variations in the delay imposed upon the signal pulses so that, in extreme cases, they can drift from one side to another of the reference pulse causing great distortion of the demodulated output. To guard against this each linefinder unit is individually balanced for delay, against the corresponding delay circuit inserted in the looped line between the incoming and outgoing connections of the linefinder unit to the line and this will in general stabilise the delay sufficiently to obviate this occurrence. Where the delay circuits are lumped together on one or more parts of the looped line however, more complicated methods of ensuring that the reference pulse is on the same side of the signal pulse, are necessary and this will usually involve the timing of the reference pulse being further away from the signal pulse. Any slow change of the mean position of the signal pulses in relation to the reference pulses will merely alter the direct current component of the demodulated signal and will not cause distortion.

Where demodulators are used of the type described in my copending applications numbered 15,582/48 and 14,185/48, filed March 18, 1948, and March 11, 1948, respectively, the time between the reference pulse and the signal pulse is made to determine the width of a width-modulated pulse delivered to the tube. The tube must be designed to handle the greatest width of input pulse resulting from maximum modulation deviations of the signal pulse combined with maximum delay drift away from the reference pulse.

This may not always be convenient and it is possible to use a rectifier gate demodulator of the type where the reference pulse opens a gate and permits a current to flow and the signal pulse closes it and stops the current. The resulting currents may be amplified if their level is insufficient and passed through a low pass filter (also forming part of demodulator 18), from which they will emerge at signal frequencies with the pulse component removed by the filter.

In case 3 a demodulator of the type described in my copending application Serial No. 756,262 may be used.

The design of unit 14 (Fig. 1) for cases 2 and 3 present special problems.

In case 2, the rectangular wave form derived from the pulse on any given channel, returning along portion 25 of the looped line, may wander too much due to modulation or the instability of the various delay circuits through which it passes, to be certain of always synchronising with some part of a later pulse of the same channel or of never over-lapping the pulse of an adjoining channel. This problem becomes more acute as the number of channels served by a linefinder group, is increased. In case 3, as described above, the timing of the pulses is likely to vary, from modulation alone, between wide limits which may cause a returning pulse from line portion 25 to overlap the pulses of other channels and whilst the variation is limited by the fact that the time between a pulse on any channel and a later one of the same channel, with which the first is required to synchronise on its return after making a circuit of the looped line, is large in relation to the time between peaks of adjacent cycles of the modulating signals, it is nevertheless possible for overlapping of channels to take place in 14 in the presence of sharp transients in the modulating signals.

The problem in both case 2 and case 3, may be solved by arranging for the transit time round the looped line to be appreciably less than the minimum period between successive pulses on any one channel and by storing information as to the nature of the pulse (whether level A, B or C) and releasing this information at the right moment for correct operation of device 14.

The blocking and extinguishing pulses can be provided from a source common to several line finder groups and consequently the use of comparatively elaborate hard tube circuits may be warranted.

Other means of achieving the required synchronisation, between returning pulses from line portion 25 and the pulses of a later cycle from terminal 7, are possible, for use in cases 2 and 3. For instance, one pulse of the pulse cycle may be reserved as a pilot pulse, the timing of this pulse depending on its return in a later pulse cycle at terminal 7, of Fig. 1.

The pilot pulse could have any convenient distinguishing characteristic, for instance, it could be the first pulse of a pulse cycle, following a longer time interval between consecutive pulse cycles, than the normal inter-pulse interval.

It could be arranged for the time difference between the returning pilot pulse and a pilot pulse from terminal 7 to be converted into a voltage proportional to the said time difference and for this voltage to control a variable delay circuit inserted somewhere in the looped line so as to bring the two pilot pulses into phase.

This may be achieved by incorporating in some or one of the delay circuit, 4, 5, 6, 8, 9 or 10, or in an additional delay circuit, an inductive component or components having a magnetic circuit to which the said control voltage could be applied to saturate it. The inductance of the said components and consequently the delay period of the delay circuit of circuits containing them, would thus vary in step with variation of the said control voltage.

Alternatively the said control voltage can be used to vary the restoring time of a chain of triggered discharge tubes inserted in the looped line. The maximum restoring time of each triggered tube must be less than the minimum interpulse interval so that the first tube of the series would always be ready to receive a succeeding pulse.

Each successive tube in the train would impose a certain delay upon the pulses and the number of tubes required would depend on the overall delay required to bring returning pulses from line portion 25 into phase with later pulses at terminal 7.

The circuit commonly known as the "Eccles-Jordan" circuit, could be used in this role.

The so-called "self-restoring" Eccles-Jordan circuit would be most suitable. A pulse applied to the circuit, changes it from one stable condition to another stable condition and it reverts to the first condition automatically after a period which can be adjusted by a control voltage. On restoring the circuit an output pulse can be taken from the circuit, and seen after restoring the circuit is ready to be switched over by another pulse. Thus the output pulse is delayed in relation to the input pulse by an amount which can be varied by varying the said control voltage.

To produce delays large in relation to the spacing between pulses, several such circuits may be used in cascade, the output pulse of one circuit being used as the input pulse of the next.

Other circuits, well known in the art, can be used in a similar way in place of an Eccles-Jordan circuit.

It will thus be seen that this invention enables a comparatively large number of substations to be served by a lesser number of communication paths, in systems where such paths consist of different pulse time positions in a cycle of pulses.

What is claimed is:

1. A pulse transmission system comprising means for selecting pulse times from a first pulse repetition time cycle, said means comprising a number of individual time pulse selecting means, each adapted to respond to a marked pulse, an associated local pulse circulation ring for use in selection of marked pulse times and a transmission channel for said first pulse cycle incoming to said circulation ring, said circulation ring including delay means such that a marked pulse completing a circuit of the ring without response meets the next incoming pulse of the same time position, and means for marking an incoming pulse if it coincides with a circulated marked pulse, means for creating pulses in a second independent pulse repetition time cycle, means for respectively transferring modulations carried by selected pulse times of said first time cycle to a corresponding number of pulse times in said second time cycle, said means comprising means for de-modulating the modulations on said selected pulse times, means for selecting pulse times in said second time cycle and means for modulating said last mentioned pulses with the product of said de-modulating means.

2. A pulse transmission system as claimed in claim 1 further comprising means whereby the selecting means is responsive to a first marking modulation to cause selection of a pulse time and to a second marking modulation of the same pulse time to cause disconnection of said pulse time.

3. A pulse time transmission system, as claimed in claim 29, in which the system comprises a telecommunication exchange comprising a plurality of sub-stations and a main station, means at said sub-stations for modulating pulses of the first pulse repetition time cycle with calling or selecting and clearing signals, and in which the means for selecting pulse times is located at said main station and is adapted for responding to a calling or selecting modulation to cause selection of a pulse time, and for responding to a clearing modulation of the same pulse time to cause disconnection of said pulse time.

4. A pulse transmission system as claimed in claim 1 in which said selecting means comprises a number of individual time pulse selecting means each adapted to respond to a marked selection pulse, and in which means is provided whereby a marked pulse is continuously offered to all of said individual selecting means until accepted by one of said individual selecting means.

5. A telecommunication transmission system as claimed in claim 4 in which each individual selecting means is individually associated with a predetermined position in the second time cycle.

ALEC HARLEY REEVES.

REFERENCES CITED

The following references are of record in the file of this patent:

UNITED STATES PATENTS

| Number | Name | Date |
| --- | --- | --- |
| 2,418,116 | Grieg | Apr. 1, 1947 |
| 2,420,374 | Houghton | May 13, 1947 |
| 2,421,017 | Deloraine | May 27, 1947 |
| 2,447,233 | Chatterjea | Aug. 17, 1948 |
| 2,506,613 | Ronsom | May 9, 1950 |
| 2,509,218 | Deloraine | May 30, 1950 |
| 2,524,776 | Deloraine | Oct. 10, 1950 |
| 2,524,861 | Wallace et al. | Oct. 10, 1950 |

FOREIGN PATENTS

| Number | Country | Date |
| --- | --- | --- |
| 600,258 | Great Britain | Apr. 5, 1948 |